United States Patent [19]

Moorhouse

[11] Patent Number: 4,501,676

[45] Date of Patent: Feb. 26, 1985

[54] POLYTETRAFLUOROETHYLENE SOLID LUBRICANT MATERIALS

[75] Inventor: Peter Moorhouse, Whitley Bay, England

[73] Assignee: International Research & Development Company, Newcastle-upon-Tyne, England

[21] Appl. No.: 464,723

[22] Filed: Feb. 7, 1983

[30] Foreign Application Priority Data

May 19, 1982 [GB] United Kingdom ............... 8214653

[51] Int. Cl.$^3$ ............................................. C10M 7/02
[52] U.S. Cl. ..................................... 252/12; 252/12.2
[58] Field of Search ............................... 252/12, 12.2

[56] References Cited

U.S. PATENT DOCUMENTS 2,995,462 8/1961 Mitchell et al. ....................... 252/12
4,312,772 1/1982 Mori ..................................... 252/12
4,394,275 7/1983 Bickle et al. .......................... 252/12

FOREIGN PATENT DOCUMENTS 923735 4/1963 United Kingdom.
1018269 1/1966 United Kingdom.
1106850 3/1968 United Kingdom.
1289594 9/1972 United Kingdom.
1391011 4/1975 United Kingdom.
1534154 11/1978 United Kingdom.

Primary Examiner—Jacqueline V. Howard
Attorney, Agent, or Firm—Robert T. Gammons

[57] ABSTRACT

The wear-resistant properties of a material containing PTFE and lead are improved by the addition of starch or cellulose when the solid lubricant is supported by a substrate of steel or beryllium-copper. The carbohydrate may be partially pyrolized but must not undergo oxidation. The substrate surface is preferably etched with pockets which are filled by the lubricant.

6 Claims, 1 Drawing Figure

POLYTETRAFLUOROETHYLENE SOLID LUBRICANT MATERIALS

The invention relates to solid lubricant materials composed principally of polytetrafluoroethylene.

Such materials are used in self-lubricating bearings or sliding surfaces such as shafts, bushes, thrust faces or collars, wear pads or special shaped faces such as spherical or conical seatings. Also bearing faces in seals, gears, roller chains or electrical slip ring or commutator and brush combinations are other possible applications where improvements in self lubricating materials are desirable.

Polytetrafluoroethylene (PTFE) is an extremely effective lubricant which can provide low friction and wear of sliding surfaces without the use of liquid lubricants i.e. for dry running. In its simplest form PTFE may be applied to a metal bearing surface as a thin bonded coating or it may be incorporated into the surface of bearing materials. Commercially available dry bearing materials based on PTFE lubricants normally comprise a PTFE layer on a metallic substrate with reinforcements of the PTFE by a porous bronze underlayer or metallic fibres, gauzes or woven mesh. In a recent development a regular array of micro pockets or cavities are etched in the surface of a metallic substrate and the cavities are filled and the surface is overlaid with a PTFE based lubricant compound (J. K. Lancaster, Royal Aircraft Establishment; U.K. Patent Specification No. 1,596,279).

All these bearing materials have a finite life which is a function of the rate at which the solid lubricant is used up by wear. Improvements to the solid lubricant formulation which provide longer lubricant film life or reduced wear of the matrix containing the lubricant allow longer life bearings to be developed.

It has previously been found that the addition of lead or lead oxide to PTFE reduces the wear rate of the bearing material (see Pratt G. C. "Recent developments in polytetrafluoroethylene-based dry bearing materials and treatments" Proc.Instn.Mech.Engrs. Volume 81, Pt.3, 1966–67). Additives which produce greater wear resistance enable bearings to last longer. Also as the wear rate of such dry bearings generally increases with increasing bearing load a reduction in the wear rate by means of an improved lubricant formulation enables the same life to be obtained at a higher bearing load. Examples of solid lubricants consisting of PTFE and lead end of substrates to which they may be applied are given in the abovementioned U.K. Patent Specification No. 1,596,279.

In accordance with the present invention there is provided a wear-resistant bearing material comprising a solid lubricant layer of polytetrafluoroethylene and lead on a substrate of beryllium-copper or of steel, wherein the lubricant layer additionally contains starch or cellulose which may be partially pyrolised at temperatures up to 400° C. but without substantial oxidation.

Oxidation or burning of the starch or cellulose can be avoided if pyrolization takes place at temperature below about 340° C. but it is desirable, and at higher temperatures essential, to use a non-oxidising atmosphere such as nitrogen. If complete pyrolisis is effected in a non-oxidising atmosphere at 1000° C. to produce amorphous carbon, or if other forms of pure carbon are used, no improvement of wear-resistance is obtained. Throughout this specification, therefore, "partially pyrolised" refers to pyrolisis at temperatures up to 400° C. under conditions such that oxidation or burning is substantially avoided. Unless a non-oxidizing atmosphere is used, the temperature should not exceed 340° C.

Particularly good results are obtained when the solid lubricant is inserted into surface pockets in the substrate as described in U.K. Specification No. 1,596,279. The invention may also be applied to substrates having a porous surface containing small cavities or pockets produced by methods such as etching, sintering (see U.K. Specification No. 657,080) pressing, machining or rolling and in which cavities are filled with the lubricating mixture which also overlays the surface. The lubricant can be applied as an aqueous dispersion of PTFE and lead particles to which α-amylose starch has been added. The dispersion is applied as a thin layer which is then dried out and sintered by heating.

BRIEF DESCRIPTION OF THE DRAWING

FIGURE I shows the friction and wear performance of hearing substrates of beryllium-copper with a layer of two different lubricant formulations.

EXAMPLE 1

Figure 1:
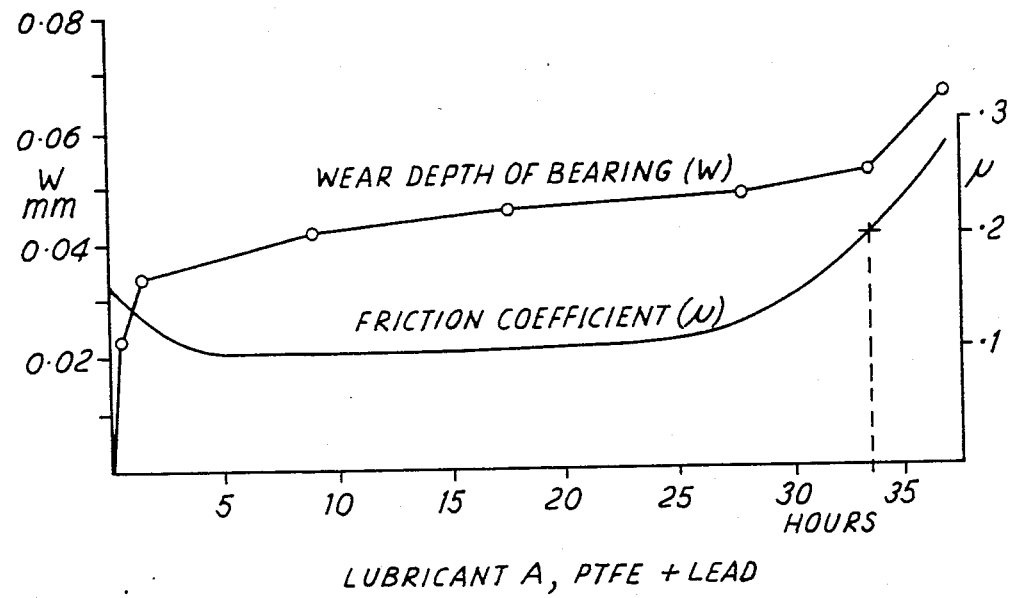
Figure 1:
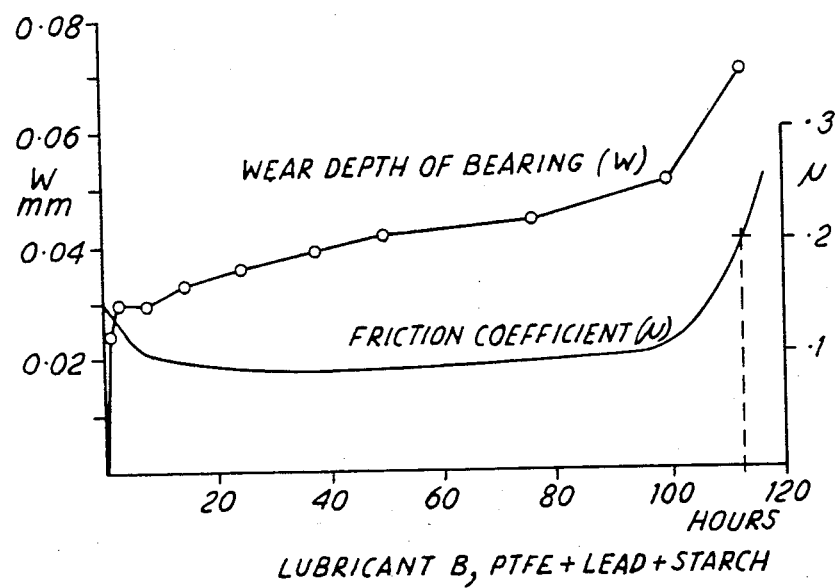

A beryllium-copper blank containing 1.8% beryllium and approximately 3 mm thick was processed by a photolithographic and etching technique to produce a surface containing a regular array of circular pockets or cavities 0.38 mm diameter and 0.1 mm maximum depth disposed with the pocket centres in straight lines in two normal directions and with the pitch of the pocket centres equal to 0.45 mm. A suitable lubricating mixture is prepared by dissolving 0.7 g of α-amylose starch in 2 ml of demineralised water which is then added to 6.25 ml of an aqueous dispersion containing 60% by weight of submicron sized PTFE particles plus a wetting agent. 10.5 g of sub 40 micron lead particles are added and stirred in. Other methods however may be used to homogeneously mix starch, PTFE and lead. The mixture is then applied to the bearing substrate in sufficient quantity to fill the surface cavities and also to provide an extra layer of 0.05 to 0.25 mm thickness. The lubricant layer is allowed to dry and is then cured in a non-oxidising atmosphere for between five minutes and two hours at 320° to 380° C. and consolidated by pressing. Pressing of the lubricant layer may be carried out by a variety of methods e.g. by interposing a layer of thick rubber or polymer between the lubricant layer and a press anvil. The essential requirement is to compass the cured lubricating mixture in the pockets or cavities so that the lubricant is fully compacted and is essentially free of voids or porosity. When the lubricant has been compacted the lubricant layer may be sized if required by machining or abrasive grinding to a final thickness in the range 0.005 to 0.1 mm. To demonstrate the effectiveness of the additive, specimens of the prepared bearing material are then tested in a rig to evaluate their friction and wear performance.

The method of testing is that described by Lancaster in Tribology International Apr. 1979, 67–75, and is intended to provide a rapid assessment of the relative wear properties of different thin-layer type dry bearing. A specimen of the bearing material is loaded with a force of 25 ON against the periphery of a finely ground 25 mm diameter hard tool steel roller rotating at 500 rev/min with the bearing surface of the specimen facing the roller. Also the specimen is made to oscillate at constant velocity over a stroke of 12 mm at 3 cycles per minute. The rig enables the friction coefficient and the wear depth to be monitored. In these tests it is arranged that the axis of the rows of lubricant filled pockets in the bearing material are at 45° to the directions of oscillation. The friction and wear performance of bearing substrates consisting of beryllium-copper with etched pockets 0.38 mm diameter by 0.1 mm deep which were filled and overlaid with two different lubricant formulations is shown in FIG. 1. Lubricant formulation A is composed of PTFE and lead whereas lubricant formulation B, having the same PTFE and lead content as formulation A, also contains starch.

Lubricant formulation B gave a much longer life, a lower wear rate and a slightly lower coefficient of friction than lubricant formulation A, the life being assessed as the period after which the coefficent of friction and wear start to increase rapidly which denotes the onset of bearing destruction. Bearing lives with other additives and with different substrate materials are shown in Table 1.

longer bearing life than did lubricant A composed of PTFE+lead when applied to etched pocket hardened steel substrates. On etched pocket substrates composed of 10% tin phosphor bronze the bearing lives were not significantly different with lubricants A and B and thus starch or other carbohydrates are only effective with selected substrate materials.

EXAMPLE 2

The invention may be further described as applied to thin bonded lubricant films on metal surfaces. To specimens of plain beryllium copper were each grit-blasted on one face and to this face of each specimen was applied a layer of PTFE based lubricant of thickness 0.025 mm and cured at 340° C. for 10 minutes. The lubricant applied to one specimen was composed of PTFE+lead (lubricant A) and that applied to the other specimen was PTFE+lead+starch (lubricant B). In life tests carried out on the test rig described previously lubricant B gave a wear life of 30 minutes compared with 12 minutes obtained with lubricant A. These results show that the

| Substrate metal into which cavities were etched | | Lubricant formulation used to fill cavities | Wear life (hours) | | Mean |
|---|---|---|---|---|---|
| Beryllium copper | A | PTFE + lead | 33.5, | 28.0 | 30.8 |
| (1.8% Be) | B | PTFE + lead + starch | 113.0, | 71.8 | 92.4 |
| | C | PTFE + lead + pyrolised starch (pyrolised at 340° C.) | 130.5, | 157.0 | 143.8 |
| | D | PTFE + lead + pyrolised cellulose (pyrolised at 340° C.) | 101.0 | | |
| | E | PTFE + lead + sugar | 32.0, | 44.0 | 38.0 |
| | F | PTFE + lead + activated carbon | 32.0 | | |
| | G | PTFE + lead + pyrolised starch (pyrolised at 1000° C.) | 0.1, | 0.2 | |
| Hardened steel | A | PTFE + lead | 15.7, | 35.5 | 25.6 |
| 0.6% C, 1.8% Si, 0.8% Mn) tempered to 260 VHN | C | PTFE + lead + pyrolised starch (pyrolised at 340° C.) | 141.1, | 113.5 | 127.3 |
| Phosphor bronze | A | PTFE + lead | 7.8, | 13.6 | 10.7 |
| (10% Sn, 0.5% P) | B | PTFE + lead + starch | 5.8, | 8.1 | 7.0 |

The improvement obtained by adding starch to the PTFE+lead is substantiated by duplicate tests. Lubricants C and D containing pyrolised starch and cellulose also gave much better bearing lives than lubricant A on beryllium copper substrates. The pyrolised carbohydrates in lubricants C and D are added at the rate of 1 gram per 10.5 grams of lead and 6.25 ml. of aqueous PTFE dispersion. Since the carbohydrate typically loses sixty percent of its original weight on pyrolysis at 340° C. for 30 minutes one gram of pyrolised material is produced from 2.5 grams of untreated carbohydrate which is a larger starting weight than is included in lubricant B. Lubricant E containing 0.7 grams of sugar produced results which may indicate a longer average life on an etched beryllium copper substrate than lubricant A but the effect was not as great as those lubricants containing starch or starch pyrolised at 340° C.

Lubricants F and G in Table 1 in which additives of activated carbon and starch pyrolised at 1000° C. have been added respectively at the rate of 1 gram of additive to 10.5 grams of lead and respectively 6.25 ml of aqueous PTFE dispersion demonstrate that these essentially pure carbons do not improve the bearing life as compared with lubricant A. Thus it is essential that the material added as in a thermally degradable condition, i.e. containing all or a proportion of the H and O atoms of the original C—H—O carbohydrate formula.

Referring to Table 1 lubricant B composed of PTFE+lead+starch pyrolised at 340° C. provided a addition of starch improves the wear life of thin bonded films of PTFE+lead on grip-blasted beryllium copper surfaces running against a hardened and finely ground tool steel roller.

While Example 1 relates to a specific beryllium-copper composition it is believed that any precipitation-hardenable beryllium-copper alloy could be employed as a substrate.

What is claimed is:

1. In a wear-resistant bearing material comprising a substrate of beryllium-copper or of steel and a solid lubricant layer on the substrate, said lubricant layer being in the form of a matrix comprised principally of polytetrafluoroethylene with lead as an additive, the improvement wherein the lubricant layer additionally contains starch or partially pyrolized cellulose.

2. A material as claimed in claim 1 wherein the starch is partially-pyrolized starch.

3. A material as claimed in claim 1 in which the substrate has a regular array of pockets formed in its surface and the lubricant layer fills and covers the pockets.

4. A material as claimed in claim 2 in which the substrate has a regular array of pockets formed in its surface and the lubricant layer fills and covers the pockets.

5. A method of making a wear-resistant bearing material comprising applying to a substrate of beryllium-copper or of steel an aqueous dispersion of PTFE, lead, and alpha amylose starch, drying the dispersion to form a layer on the substrate, curing the layer by heating in a non-oxidising atmosphere, and consolidating the layer by pressing.

6. A method according to claim 5 comprising employing a substrate containing an array of pockets formed in its surface and applying the lubricant layer in sufficient quantity to fill the pockets and to provide a surface layer.

* * * * *